O. S. OSBORN.
Landau Carriage-Hooks.

No. 139,515. Patented June 3, 1873.

Witnesses
J. H. Shumway
A. J. Tibbits

Oliver S. Osborn
Inventor
By Atty.
John F. Earle

UNITED STATES PATENT OFFICE.

OLIVER S. OSBORN, OF NEW HAVEN, CONNECTICUT.

IMPROVEMENT IN LANDAU-CARRIAGE HOOKS.

Specification forming part of Letters Patent No. 139,515, dated June 3, 1873; application filed April 30, 1873.

*To all whom it may concern:*

Be it known that I, OLIVER S. OSBORN, of New Haven, in the county of New Haven and State of Connecticut, have invented a new Improvement in Landau-Carriage Hook; and I do hereby declare the following, when taken in connection with the accompanying drawings and the letters of reference marked thereon, to be a full, clear, and exact description of the same, and which said drawings constitute part of this specification, and represent, in—

Figure 1:
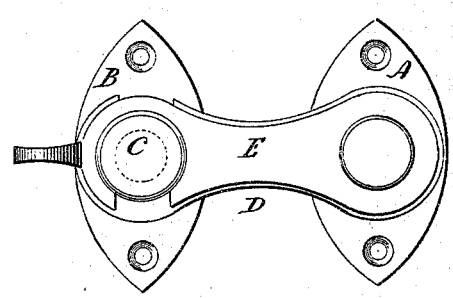
Figure 2:
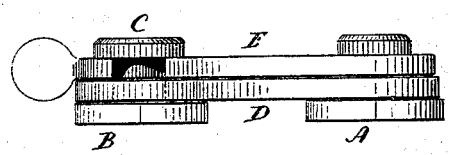
Figure 3:
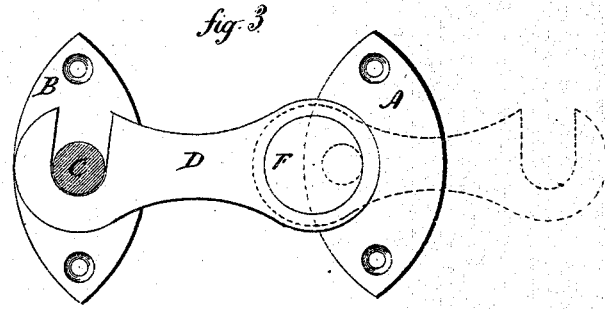

Figure 1, a top view; Fig. 2, an edge view; Fig. 3, a diagram illustrating the operation; and in Fig. 4, a longitudinal central section.

This invention relates to an improvement in the hooks or fastenings by means of which the parts of the top of a landau and other carriages are secured together when closed.

The device usually employed for this purpose has been a hook, to secure which it was necessary that the parts be drawn close together before the hook could be secured. As it is often difficult to draw the parts so closely together to engage the hook, the object of this invention is the construction of a device which secured to one part will engage the connection on the other part before the parts have been completely brought together.

The invention consists in a hook attached to one part and a corresponding connection for the said hook on the other part, combined with a cam, by the turning of which, after the hook has been engaged, the two parts may be drawn close together.

Figure 4:
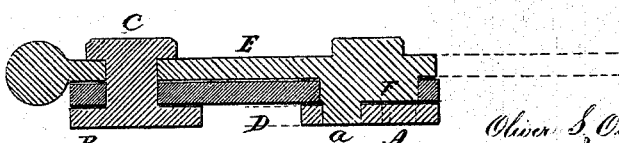

A is the plate which forms the connection of the hook to one part; B, the plate upon upon the other part, carrying the device to which the hook is secured, that device here represented as a stud, C. D is the principal hook, of substantially the usual form; E, an auxiliary hook secured to the plate A through the hook D by a pivot, *a*, and so as to turn freely, as from the position in Fig. 1 to that in broken lines Fig. 3. Between the pivot and hook E an eccentric, F, is formed as a part of and turning with the hook E. On to this eccentric the hook D is fitted, as seen in Figs. 3 and 4, the said eccentric forming the bearing upon which the hook D turns. The length of the two hooks when closed, as in Figs. 1 and 2, is substantially the same, both closing upon the same stud, preferably from opposite sides. When closed, the plates A B are brought into their nearest position to each other, and which is the closed position of the parts of the carriage-top to which they are attached. Turning the hook E from that closed position—say, to that position shown in broken lines, Figs. 3 and 4, extends or forces asunder the plates A B; the hook D turned away allows the top to be opened. When the parts of the top are drawn toward each other, with the hook E in this position, the hook D will engage the stud C before the parts of the top are brought together, then bringing the hook E around on to the stud C, the cam F, working in the hook D, forcibly draws the parts together until the hook E is closed upon the stud C, as seen in Figs. 1 and 2.

By this construction the necessity of drawing the two parts closely together before the hook can be engaged is avoided, and the auxiliary hook E forms a lever through the cam F to greatly facilitate the drawing of the parts together.

The lever E is here represented as forming an auxiliary hook, but this is not essential, it being practically employed only as a lever by which to operate the eccentric.

I claim as my invention—

In combination with the hook D attached to one part of the carriage-top, and a securing device, C, upon the other part, an eccentric, F, which forms a bearing for the hook D, and a lever, E, by means of which the said eccentric is made to cause the two points of attachment to approach or recede from each other, substantially as set forth.

OLIVER S. OSBORN.

Witnesses:
J. H. SHUMWAY,
A. J. TIBBITS.